United States Patent Office 3,115,514
Patented Dec. 24, 1963

3,115,514
PROCESS FOR PREPARING NITRILES BY PYROLYSIS OF ESTERS OF CYANOFORMIC ACID
William A. Sheppard, Wilmington, Del., assignor to E. I. du Pont de Nemours and Company, Wilmington, Del., a corporation of Delaware
No Drawing. Filed Oct. 5, 1959, Ser. No. 844,204
8 Claims. (Cl. 260—465)

This invention relates to a new process for preparing nitriles. More particularly this invention relates to a new process for preparing organic nitriles from esters of cyanoformic acid.

Nitriles, also called organic cyanides, are well known organic chemicals which find use in many technical applications. They are used, for example, as solvents, surface-active agents, penetrating agents, and as intermediates for the preparation of amines, amides, thioamides, amidines and carboxylic acids.

Nitriles are presently prepared by a number of methods, e.g., by the reaction of halogen-bearing compounds with metallic cyanides, by the addition of hydrogen cyanide to unsaturated compounds and by the dehydration of amides or the ammonium salts of organic acids. These methods, as well as others described in the literature, frequently give only low yields of the desired nitriles or they result in the formation of a substantial quantity of by-products from which it is difficult to separate the nitrile in pure form. A process for preparing nitriles in good yields is a desirable goal.

It is an object of this invention to provide a new process for the preparation of organic nitriles. A further object is to provide a new process for the preparation of organic nitriles from esters of cyanoformic acid. Other objects will appear hereinafter.

These objects are accomplished according to this invention by the following process for preparing organic nitriles which comprises heating and thermally decomposing an ester of cyanoformic acid (also called cyanocarbonic acid) with an alcohol, said esters being further defined by the following general formula:

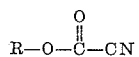

where R is an aliphatic, cycloaliphatic or aralkyl group which is singly bonded to the ester oxygen through a carbon which is not a member of an aryl group, i.e., through an aliphatic carbon atom.

The R group in the general formula can be straight chain or branched chain, it can have a ring structure, or a combination of ring structures and open chain structures. R can be saturated or unsaturated. The R group can bear a broad range of substituents including halogen of atomic number 9 to 35 (fluorine, chlorine, bromine), cyano (—CN), and sulfonamide groups, hydrocarbyloxy (R'O—) and hydrocarbythio (R'S—) groups, R' being hydrocarbon.

A preferred group of reactants are esters of cyanoformic acid with alcohols in which any beta-carbons, i.e., carbons bonded to the hydroxyl bearing carbon, are free of hydrogen. Esters of this type provide good yields of the desired nitriles in the process of the invention. In the preferred group of reactants, the radical R in the previous general formula is an aliphatic, cycloaliphatic or aralkyl group in which any carbons linked directly to the carbon singly bonded to the ester oxygen, i.e., the carbons in the 2-position in the group R, are hydrogen-free.

The process of the invention is conveniently carried out by passing a cyanoformate ester of the formula shown above through a reaction zone heated to a temperature sufficient to effect thermal decomposition of the cyanoformate. The temperature required for decomposition will be dependent to some extent on the reactant which is employed but it will generally lie between about 400° and 1000° C. Measurable conversions to nitriles are obtained in the lower temperature range but for high conversions, a temperature above about 500° C. is usually employed. At temperatures above about 1000° C. decomposition to undesirable by-products may occur. Cyanoformate esters in which R in the generic formula given earlier is hydrocarbon give the best yields of nitriles at a pyrolysis temperature of about 600–900° C. This range of temperature, i.e., 600–900° C., is preferred.

The pressure at which the pyrolysis is performed is not critical, pressures ranging from a few microns of mercury to atmospheric or even superatmospheric being operable. In general, it is preferred to use the lower pressures, i.e., pressures of less than 200 mm. of mercury, in order to get the reaction products out of the reaction zone as rapidly as possible so that formation of undesirable by-products is minimized.

The rate at which the cyanoformate ester is passed through the reaction zone is not critical, although for economic reasons it is preferred to use a rate as high as possible. It is only necessary to heat the cyanoformate to the reaction temperature for a short time to obtain the desired organic nitrile. The rate of flow of the reactant through the reactor generally increases at the lower pressures. Consequently, the shortest contact times of reactants are obtained with the lowest operating pressures.

In the pyrolysis of cyanoformate esters which are polymerizable, i.e., esters which have a vinyl group in the radical R, it may be desirable to add a small amount of polymerization inhibitor, e.g., hydroquinone, to the cyanoformate before or during its passage through the reaction zone.

The reactor can be constructed of any inert heat-resistant material. The reactor can be made of quartz, heat-resistant glass, stainless steel, or other inert material. The reactor can, if desired, be packed with inert materials, e.g., granular quartz, to provide better heat transfer. Materials, such as metals which may be attacked by the cyanoformate ester to give undesirable by-products under the conditions used, should not be employed. The reaction zone can be heated by conventional means. Electric heaters are very satisfactory for this purpose.

The reaction products are conveniently collected in traps cooled to a low temperature with, for example, solid carbon dioxide-acetone mixture or liquid nitrogen. For high boiling reaction products, the traps can, if desired, be cooled with conventional ice-water mixtures. The crude reaction products are separated into pure components by conventional means, e.g., fractional distillation through an efficient column. Separation of pure components is also accomplished by selective adsorption procedures with subsequent recovery of the absorbed material.

The following examples in which parts are by weight are illustrative of the invention.

In these examples the reactor consists of a quartz tube, approximately 1" in diameter (inside) and approximately 20.5" long packed with 6 mm. sections of quartz tubing 6 mm. in diameter. The packed and heated zone is about 12" long. The reaction tube is heated externally by means of a cylindrical electric furnace and the temperature is recorded by a thermocouple placed in the center of the reaction tube. The tube is connected to a trap which is cooled to a low temperature. A high capacity vacuum pump maintains the system at the desired reduced pressure. The pressure is measured by conventional means, for example, by a mercury manometer attached to the trap. Before adding the cyanoformate ester to be pyrolyzed, the system is evacuated to a low pressure. An inert gas, for example, nitrogen, argon or helium is then introduced to bring the pressure to about one atmosphere. The system is then evacuated to the desired operating pressure and it is maintained at this pressure by a suitable regulator. The regulator shuts the system off from the vacuum pump and additional inert gas is not fed into the reaction tube unless the pressure builds up due to a leak or evolution of a noncondensable gas occurs.

The cyanoformate ester is introduced into the reaction zone gradually by conventional means, e.g., a dropping funnel, and the reaction products are condensed, as stated previously, in a trap which is cooled by a coolant capable of condensing by-products at the pressure employed. A suitable coolant for use when the reaction is conducted at relatively low pressures is liquid nitrogen. A mixture of acetone and solid carbon dioxide is suitable when the reaction is conducted at higher pressures.

EXAMPLE I

A reactor of the type described earlier is flushed with nitrogen gas and heated to a temperature of 800° C. The pressure in the tube is adjusted to 115 mm. and approximately 2 parts of methyl cyanoformate is added over a period of 25 minutes to the reactor which is maintained at about 800° C. After addition is complete the trap, cooled with liquid nitrogen, in which the reaction products are collected, is removed and the gaseous material is distilled into a second trap cooled in liquid nitrogen. This material is carbon dioxide. The liquid product (about 1.3 parts) remaining in the first trap contains about 25% by weight of acetonitrile and 75% by weight of recovered methyl cyanoformate. Pure acetonitrile (yield, about 40%) is obtained by vapor phase chromatography. Approximately 42% of unreacted methyl cyanoformate is recovered.

In a second run, approximately 7.83 parts of methyl cyanoformate is added over a period of 25 minutes to the reactor tube at a temperature of 800° C. and 120 mm. pressure. There is obtained 4.73 parts of liquid reaction product which contains approximately 25% acetonitrile and about 67% of unreacted methyl cyanoformate.

EXAMPLE II

(A) *Preparation of Benzyl Cyanoformate*

Approximately 34.1 parts of benzyl chloroformate (technical grade, 72% purity) is placed in a 4-necked round-bottom glass reaction vessel (capacity, 100 parts of water) which is fitted with a mechanically driven stirrer, thermometer, plug and a short distillation column. The distillation column is equipped with a receiver and a tube containing a drying agent. Sodium cyanide (15 parts) is added in portions to the reaction vessel with vigorous stirring. After addition is complete, the reaction mixture is heated to 45–50° C. for 8 hours and it is then allowed to stand 15–20 hours at prevailing atmospheric temperature. The liquid is distilled under reduced pressure from the reaction mixture, boiling at 30–70° C. at pressures ranging from 5 to 1.5 mm. The liquid thus obtained is distilled through an efficient fractionating column to yield 6.75 parts (29% yield) of benzyl cyanoformate, B.P. 80° C./2.5 mm.; $n_D^{25}$, 1.4050. The identity of the product is confirmed by the infrared spectrum and by elemental analysis.

*Analysis.*—Calc'd for $C_9H_7NO_2$: C, 67.1; N, 4.38; N, 8.7. Found: C, 67.3; H, 4.75; N, 8.2.

(B) *Pyrolysis of Benzyl Cyanoformate*

(1) Approximately 7.25 parts of benzyl cyanoformate is added over a period of 8 minutes to a reaction tube of the type employed in Example I, which is heated to 700° C. and maintained at a pressure of about 120 mm. There is obtained 3.76 parts of reaction products which are shown by vapor phase chromatography and infrared spectroscopy to contain 80% of phenylacetonitrile (yield, 50%).

(2) Approximately 5.48 parts of benzyl cyanoformate is added over a period of 25 minutes to the reaction tube, used in the previous part, heated to 800° C. at 110–120 mm. pressure. There is obtained 2.72 parts of a liquid reaction product which is principally phenylacetonitrile (yield, 57%).

EXAMPLE III

(A) *Preparation of Cyanomethyl Cyanoformate*

A reaction vessel (capacity, 1000 parts of water) is employed which is equipped with a mechanical stirrer, thermometer, gas inlet tube and a condenser cooled with wet ice and acetone. The condenser is equipped with a tube charged with a drying agent. The reaction vessel is charged with 40 parts of pyridine and about 215 parts of dry ethyl ether. The mixture is chilled to about −5° C. and 55 parts of phosgene are passed into the reaction vessel. A solid complex forms (pyridine and phosgene) which is suspended in the ether medium. The gas inlet tube is replaced with a dropping funnel and a solution of 28.5 parts of glyconitrile in about 35 parts of dry ether is added dropwise to the reaction mixture with stirring at a rate such that the temperature remains at −5° C. or lower. A second dropping funnel is added by employing an adapter with the condenser and a solution of 13 parts of hydrogen cyanide in about 57 parts of dry ether is placed in this funnel. There is placed in the first dropping funnel a solution of 40 parts of pyridine in about 35 parts of dry ethyl ether. Both solutions are added simultaneously at an equal rate to the reaction mixture, maintaining the reaction temperature below 0° C. The reaction mixture is stirred vigorously during the addition. After the addition is completed, the reaction mixture is stirred for 30 minutes at less than 0° C. and it is then allowed to warm gradually to 15° C. The reaction mixture is filtered and the filtrate is distilled through an efficient fractionating column. There is obtained 2.96 parts of cyanomethyl cyanoformate, B.P. 81° C./4.7 mm.; $n_D^{25}$, 1.4231. The product is crystallized from ether solution at −40° C. to yield a white, crystalline solid which is a liquid at normal atmospheric temperatures (about 25° C.). The identity of the compound is confirmed by the infrared spectrum and by elemental analysis.

*Analysis.*—Calc'd for $C_4H_2N_2O_2$: C, 43.6; H, 1.8; N, 25.4. Found: C, 43.8; H, 1.9; N, 25.2.

(B) *Pyrolysis of Cyanomethyl Cyanoformate*

Approximately 2.80 parts of cyanomethyl cyanoformate is added over a period of 6 minutes to a reaction tube of the type which is employed in Example I, which is heated to 800° C. at a pressure of 120 mm. There is obtained 1.11 parts of reaction products from which malononitrile ($CNCH_2CN$) is separated by vapor phase chromatography in a yield of about 8%. Malononitrile is identified by the formation of a strong positive blue color when treated with p-benzoquinone and ammonium hydroxide in alcohol solution according to the procedure described by Kesting, Ber. 62B, 1422 (1929).

The mechanism of the reaction is not entirely clear but it may be represented generically by the following equation:

It is evident from this equation that, ideally, the group R is carried through the process unchanged to form the organic nitrile. However, the group R in some of the ester may undergo partial rearrangement or decomposition under the conditions of the process, or some of the organic nitrile which is formed may partially decompose. In these circumstances a reduced yield of the desired organic nitrile may be obtained.

The cyanoformate esters employed as reactants are compounds which are available or which can be prepared by methods described in the literature (see, for example, German Patent 592,539, issued to Glurd, Nusaker, and Keller, January 1934). Cyanoformate esters are obtained, e.g., by the reaction of chloroformate esters with alkali or alkali metal cyanides or with hydrogen cyanide in the presence of an organic base (triethylamine, pyridine, etc.).

Examples of cyanoformate esters which can be employed as reactants are alkyl cyanoformates, such as neopentyl cyanoformate, 2,2-dimethylbutyl cyanoformate, and 2,2-dimethyloctyl cyanoformate wherein the 2,2-dimethyloctyl radical contains 10 carbon atoms; cyanoalkyl cyanoformates, such as 2,2-dimethyl-4-cyanobutyl cyanoformate; and aralkyl cyanoformates, such as p-methylbenzyl cyanoformate, p-ethoxybenzyl cyanoformate, p-methylthiobenzyl cyanoformate, 1-naphthylmethyl cyanoformate, and triphenylmethyl cyanoformate wherein the triphenylmethyl radical contains 19 carbon atoms. Other examples of cyanoformate esters which can be employed as reactants are alkenyl cyanoformates such as methallyl cyanoformate, and 2-methyl-2-butenyl cyanoformate which has one carbon-to-carbon unsaturation; alkynyl cyanoformates, such as 2-propynyl cyanoformate; haloalkyl cyanoformates, such as 2,2,2-trichloroethyl cyanoformate, 2,2,2-trifluoroethyl cyanoformate, and trichloromethyl cyanoformate. Haloaralkyl cyanoformates, such as p-bromobenzyl cyanoformate, and p-fluorobenzyl cyanoformate; and alkyl and dialkyl sulfamyl aralkyl cyanoformates, such as p-(N,N-dimethyl)sulfamylbenzyl cyanoformate and p-(N,N-diethyl)sulfamylbenzyl cyanoformate can also be used. Cyclic cyanoformates, e.g., 2,2,6,6-tetramethyl cyclohexyl cyanoformate wherein the 2,2,6,6-tetramethyl cyclohexyl radical contains 10 carbon atoms, can be employed in the process.

The procedures described in the preceding examples are broadly applicable to the preparation of organic nitriles from cyanoformate esters. For example, 2,2,2-trichloroethyl cyanoformate yields 2,2,2-trichloropropionitrile by the process of Example I. By a similar procedure, p-tolylacetonitrile is obtained from p-methylbenzyl cyanoformate, p-chlorophenylacetonitrile is obtained from p-chlorobenzyl cyanoformate, p-(N,N-diethylsulfamyl)phenylacetonitrile is obtained from p-(N,N-diethylsulfamyl)benzyl cyanoformate, 1-naphthylacetonitrile is obtained from 1-naphthylmethyl cyanoformate and 3-methyl-3-butenenitrile is obtained from methallyl cyanoformate.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Process for preparing organic nitriles which comprises heating and thermally decomposing at a temperature within the range of 400 to 1000° C. an ester of cyanoformic acid having the general formula

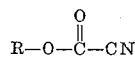

wherein R is singly bonded to the ester oxygen through aliphatic carbon and in which any carbon atom in the 2-position of said R radical is hydrogen-free, R being selected from the group consisting of (a) alkyl of at most 10 carbons,
(b) 2,2,6,6-tetramethylcyclohexyl,
(c) monocyanoalkyl of at most 6 carbons exclusive of the cyano carbon,
(d) haloalkyl of at most 2 carbons wherein the halogen is of atomic number 9 to 35,
(e) methallyl,
(f) 2-methyl-2-butenyl,
(g) 2-propynyl,
(h) aralkyl which is entirely hydrocarbon of at most 19 carbons and having at most two rings fused together,
(i) halobenzyl wherein the halogen is of atomic number 9 to 35,
(j) dialkyl sulfamylbenzyl where the alkyl groups are of at most 2 carbons,
(k) p-ethoxybenzyl, and
(l) p-methylthiobenzyl, and producing as the resulting product an organic nitrile having the general formula R—CN where R is defined as aforesaid.

2. Process for preparing aralkyl nitriles which comprises heating and thermally decomposing at a temperature within the range of 600 to 900° C. an ester of cyanoformic acid having the general formula

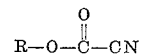

wherein R is aralkyl which is entirely hydrocarbon of at most 19 carbons and having at most two rings fused together and is singly bonded to the ester oxygen through aliphatic carbon and in which any carbon atom in the 2-position of said R radical is hydrogen-free, and producing as the resulting product an aralkyl nitrile having the general formula R—CN where R is defined as aforesaid.

3. Process for preparing alkyl nitriles which comprises heating and thermally decomposing at a temperature within the range of 600 to 900° C. an alkyl cyanoformate having the general formula

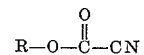

wherein R is alkyl of at most ten carbons and in which any carbon atom in the 2-position is hydrogen free, and producing as the resulting product an organic nitrile having the formula R—CN where R is defined as aforesaid.

4. Process for preparing cyanoalkyl nitriles which comprises heating and thermally decomposing at a temperature within the range of 600 to 900° C. a cyanoalkyl cyanoformate having the general formula

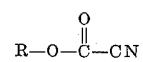

wherein R is monocyanoalkyl of at most 6 carbons exclusive of the cyano carbon and in which any carbon atom in the 2-position of said R radical is hydrogen-free, and producing as the resulting product a cyanoalkyl nitrile having the general formula R—CN where R is defined as aforesaid.

5. Process for preparing acetonitrile which comprises heating and thermally decomposing at a temperature within the range of 600 to 900° C. methyl cyanoformate, and producing as the resulting product acetonitrile.

6. Process for preparing phenylacetonitrile which comprises heating and thermally decomposing at a temperature within the range of 600 to 900° C. benzyl cyanoformate, and producing as the resulting product phenylacetonitrile.

7. Process for preparing malononitrile which comprises heating and thermally decomposing at a temperature within the range of 600 to 900° C. cyanomethyl cyanoformate, and producing as the resulting product malononitrile.

8. Process for preparing malononitrile which comprises heating and thermally decomposing cyanomethyl cyanoformate under a pressure of up to about one atmosphere and at a temperature within the range of 600 to 900° C., and producing as the resulting product malononitrile.

(References on following page)

References Cited in the file of this patent

UNITED STATES PATENTS

| | | |
|---|---|---|
| 2,476,270 | Ardis | July 19, 1949 |
| 2,665,298 | Ardis | Jan. 5, 1954 |
| 2,665,299 | Ardis | Jan. 5, 1954 |

OTHER REFERENCES

Degering, "An Outline of Organic Nitrogen Compounds," 1945, page 505.

Bergmann, "The Chemistry of Acetylene and Related Compounds," 1948, page 80.